W. Phelan,

Steam-Boiler Condenser.

No. 83,309.    Patented Oct. 20, 1868.

Witnesses:

Inventor:
Wm. Phelan
by
Mann, Fitch & Lanine

UNITED STATES PATENT OFFICE.

WILLIAM PHELAN, OF PEORIA, ILLINOIS.

*Letters Patent No. 83,309, dated October 20, 1868.*

IMPROVEMENT IN CONDENSERS.

The Schedule referred to in these Letters Patent and making part of the same.

*To all whom it may concern:*

Be it known that I, WILLIAM PHELAN, of Peoria, in the county of Peoria, and State of Illinois, have invented a new and improved Steam-Condenser; and I do hereby declare that the following is a full, clear, and exact description thereof, reference being had to the accompanying drawings, making a part of this specification, in which—

Similar letters of reference indicate corresponding parts in the several figures.

This invention relates to certain new and useful improvements on condensers for steam-engines, which are designed for condensing the exhaust steam, and at the same time employing it as a means for heating water to be supplied to steam-boilers.

The nature of my invention consists in a conical-chambered vessel, having within it a condensing-chamber of such form as to effect condensation of the steam with the greatest possible rapidity within a given space; also, a cool-water chamber, which receives water from a convenient source, and distributes it over and against the walls enclosing the upper portion of said condensing-chamber; also, a means for supplying water to and conducting it over the external surface of the outer conical jacket of the condenser; and the invention also consists in constructing the innermost conical wall with a crowning-head, arranged directly over the steam-inlet pipe, and directly beneath the cool-water-inlet pipe, so that steam, striking against one side of said cone and its crowning-head, will be rapidly condensed by cold water striking upon its opposite side, said conical wall being connected at its base to the base of an outer conical wall, so as to form, in conjunction therewith, and with an external conical jacket, a double conical condensing-chamber, enclosing a conical cooling-chamber, which latter will also serve as a reservoir for an extra supply of feed-water, under certain conditions of the condenser, as will be hereinafter explained.

The invention also consists in providing a conical steam-condenser with a conical deflecting-cap applied around a perforated portion of the cold-water-supply pipe, in such manner that the water escaping laterally from said pipe will be directed downwardly upon the external surface of the outer wall or jacket of the condenser, and caused to flow over this wall in a thin stream, thereby rapidly condensing steam which is enclosed within said wall, as will be hereinafter explained.

The invention further consists in providing for supplying water to the interior of the cool-water chamber in proper quantities, and by means of the same pipe which is used for supplying water to the external surface of the jacket surrounding the condensing and cooling-chambers, as will be hereinafter explained.

To enable others skilled in the art to understand my invention, I will describe its construction and operation.

Figure 1:
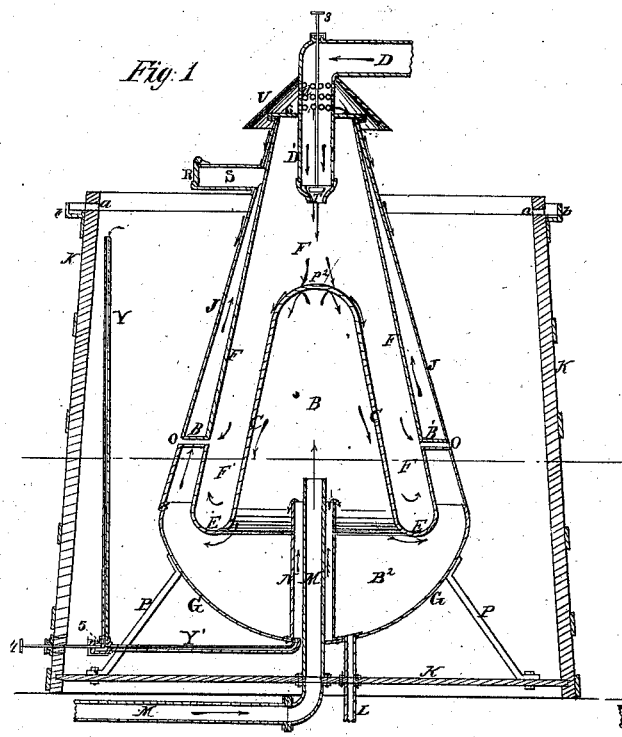
Figure 1 is a diametrical section through the improved condenser, arranged within, and adapted for a tank of water.
Figure 2:
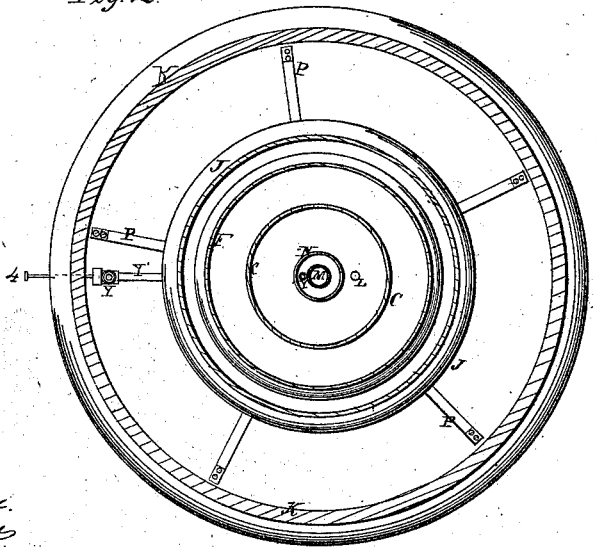
Figure 2 is a section, taken through the condenser, in the horizontal plane indicated by red line $x\,x$ in fig. 1.

In the accompanying drawings, figs. 1 and 2, I have represented my improved condenser, adapted for and arranged within a tank, K, for containing cool water, supplied to it from any convenient source, through openings $d\,d$, which are made through a feed-pipe, D. As it is desirable to keep up a constant supply of fresh water to the tank K during the operation of the condenser, I provide means for conducting water from the tank on a level with the water-line, so that the warmest water will escape, while the fresh water takes its place. For this purpose, holes, $a$, may be made through the tank, on a level with the water-line, which holes lead into a trough, $b$, arranged around the tank on its outer side. From this trough, water can be conducted off through one or more pipes.

The body of the condenser consists of three conical walls, J F C, secured together, so as to form steam-condensing chambers B, $B^1$, and $B^2$, enclosing a cool-water chamber, F'. The two cones J F are suitably secured to a cap, 6, at their upper ends, so as to leave between them the annular or conical steam-condensing chamber $B^1$, which rises from the steam-chamber $B^2$, and surrounds the internal cool-water chamber F', as shown in fig. 1. The base of the conical wall or jacket J is secured to a concavo-convex bottom wall, G, which forms the bottom of the condenser, and serves to conduct the water of condensation rapidly off through the discharge-pipe L.

The intermediate conical wall F is connected at its base to the base of the short internal cone C by a concavo-convex plate, E, which forms the lowest portion of the cool-water chamber, and allows steam to pass around it from chamber B to the chamber $B^1$, as indicated by the red arrows in fig. 1.

The internal cone C terminates at its upper end in a concavo-convex crown, $P^2$, which form is found best adapted for directing the steam, impinging against it, outwardly and downwardly against the internal wall C, as indicated by the red arrows in fig. 1.

Thus far it will be seen, from the above description, that I have three conical walls, connected by concavo-convex bases, so as to form a very large amount of surface enclosing the steam-condensing chamber, which surface or surfaces are exposed to the cooling-action of water within and without the condenser.

This condenser is supported upon legs P, which are bolted fast to the bottom of the tank K, so that water in this tank can circulate freely all around it.

The feed-pipe D passes vertically through the cap-plate 6 into chamber F', and has a valve, T, applied to its lower end, the rod 3 of which extends up and passes through the elbow of pipe D, so that this valve can be operated from without the condenser for regulating the flow of water into said chamber F'.

Directly above the cap-plate 6 is a downwardly-flaring circular plate, U, which is so arranged, with reference to the discharge-openings $d$ through pipe D, that water issuing from these openings will be deflected downward upon the cap 6, and thus caused to descend over the side of the jacket J in a regular sheet. The internal continuation D' of the feed-pipe D is arranged directly over the crown $P^2$ of the chamber B, so as to direct the inflowing water upon said crown, while steam is impinging against its internal surface. The water is indicated in the drawings by the blue arrows, and the steam by the red arrows.

The exhaust steam from the engine is conducted into the condenser by means of a pipe, M, which rises centrally through the bottom of the tank K, and through the bottom, G, of the chamber $B^2$, and extends up within the chamber formed by the internal cone C. This pipe directs the inflowing steam upwardly and against the crown $P^2$, which, in turn, directs the steam outwardly against the wall C, down which wall the steam passes, and thence rises into the chamber $B^1$, between the conical walls J F.

As the steam is condensed, the water of condensation falls upon the bottom, G, and runs off, or is drawn off through escape-pipe L.

During the condensation of steam within the chambers B $B^1$ $B^2$, there will be a partial vacuum produced in these chambers, which will cause the external pressure of the air to close, and keep closed, a valve, R, that is applied to a short pipe, S, arranged above the water-line. When condensation is not taking place within said chambers, the valve R will open and allow the steam to escape.

Valve R not only serves as an escape for the steam when not condensing, but it also serves as a means for retaining a partial vacuum in said chambers, which vacuum will, to some extent, assist the working of the engine by exhaustion.

Surrounding that portion of the steam-pipe M which enters the chamber $B^2$ of the condenser, is a tank, N, which can be supplied with water in suitable quantities, through pipes Y Y', and which is designed for warming water to be used for extra supply. By having the steam-pipe M to pass up through the tank N, a very large portion of heat will be absorbed by the water in this tank. At the same time, the water therein will serve, to some extent, as a means for assisting in condensing the steam on its way to the first chamber of the condenser.

By this arrangement of the tank N, the extra feed-water will be heated before it escapes from the condenser.

The pipe Y' leads to a valve-chamber, containing a valve, 5, controlled by a rod, 4, and from said valve-chamber the pipe Y rises nearly to the water-line, so that water will be taken from the highest and of course the warmest part of the tank, thereby utilizing the waste heat.

Figure 3:
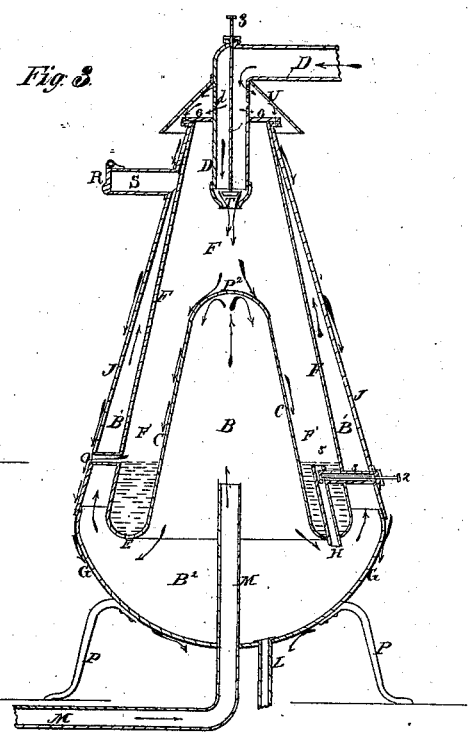
Figure 3 is a diametrical section through the condenser, arranged and adapted for being used without a tank.

In fig. 3, I have represented my condenser arranged and adapted for use without a water-tank. It will be seen, by reference to this figure, that I dispense with the extra feed-water vessel N, surrounding the steam-pipe M, and also the pipes Y Y' for supplying this vessel with water from the tank K, and employ in lieu thereof a pipe, H, leading into chamber $B^2$ from the cool-water chamber F', and provided with a valve, S', and valve-rod 2, which latter passes outwardly through the pipe S. By means of the pipe H and its valve, any amount of extra feed-water can be supplied to the chamber $B^2$ from the chamber F'.

In all other respects, the condenser shown in fig. 3 is constructed precisely like the condenser shown in the tank. In the operation of the condenser of fig. 1, cool water, flowing from the perforations $a$ through pipe D, will be directed downward by the deflector U upon the cap-plate 6, and thence flow over the outer walls J and G, finally escaping into a suitable receiver, placed beneath the condenser.

The water which is allowed to escape from the cool-water chamber F' through pipes O, also flows over a portion of the outer wall of the condenser, and escapes into the receiver beneath it, thereby operating a second time as a cooling and condensing-agent for the steam in the condenser.

The extra feed-water pipe H being placed within the condenser, as described, it will not be liable to freeze, and, by means of the valve-rod 2, carried to the engine-room, the valve can be operated from such point.

Having described my invention,

What I claim as new, and desire to secure by Letters Patent, is—

1. A central crowning-cone, C, applied within the cones J F, so as to form a condensing-chamber B, surrounded by a cool-water chamber, F', substantially as described.

2. Cones C F, connected by a concavo-convex bottom, E, when these cones are arranged substantially as and for the purposes described.

3. The jacket J and its concavo-convex bottom G, with the cones C F, constructed and arranged substantially as described.

4. The valve T, arranged with relation to the internal extension of feed-pipe D, substantially as described.

5. The deflecting-plate U, applied over the condenser, in combination with outlets $a$ through the feed-pipe D, substantially as described, and for the purposes set forth.

6. The arrangement of outlet-pipes O with relation to chamber F' and the outer jacket J G, substantially as described.

7. The arrangement of the valve R with relation to chamber $B^1$ and passage S, substantially as described.

8. The valve T, arranged with relation to the internal extension of feed-pipe D, substantially as and for the purposes described.

9. The deflecting-plate U, applied over the condenser, in combination with outlets $d$ through the feed-pipe D, substantially as and for the purposes described.

WILLIAM PHELAN.

Witnesses:
F. W. VOIGHT,
J. H. SPARROW.